Sept. 18, 1973　　J. W. TILEY　　3,759,682
METHOD OF AND SYSTEM FOR THREADING
GLASS CONNECTORS AND CONNECTOR Filed Dec. 13, 1971　　3 Sheets-Sheet 1

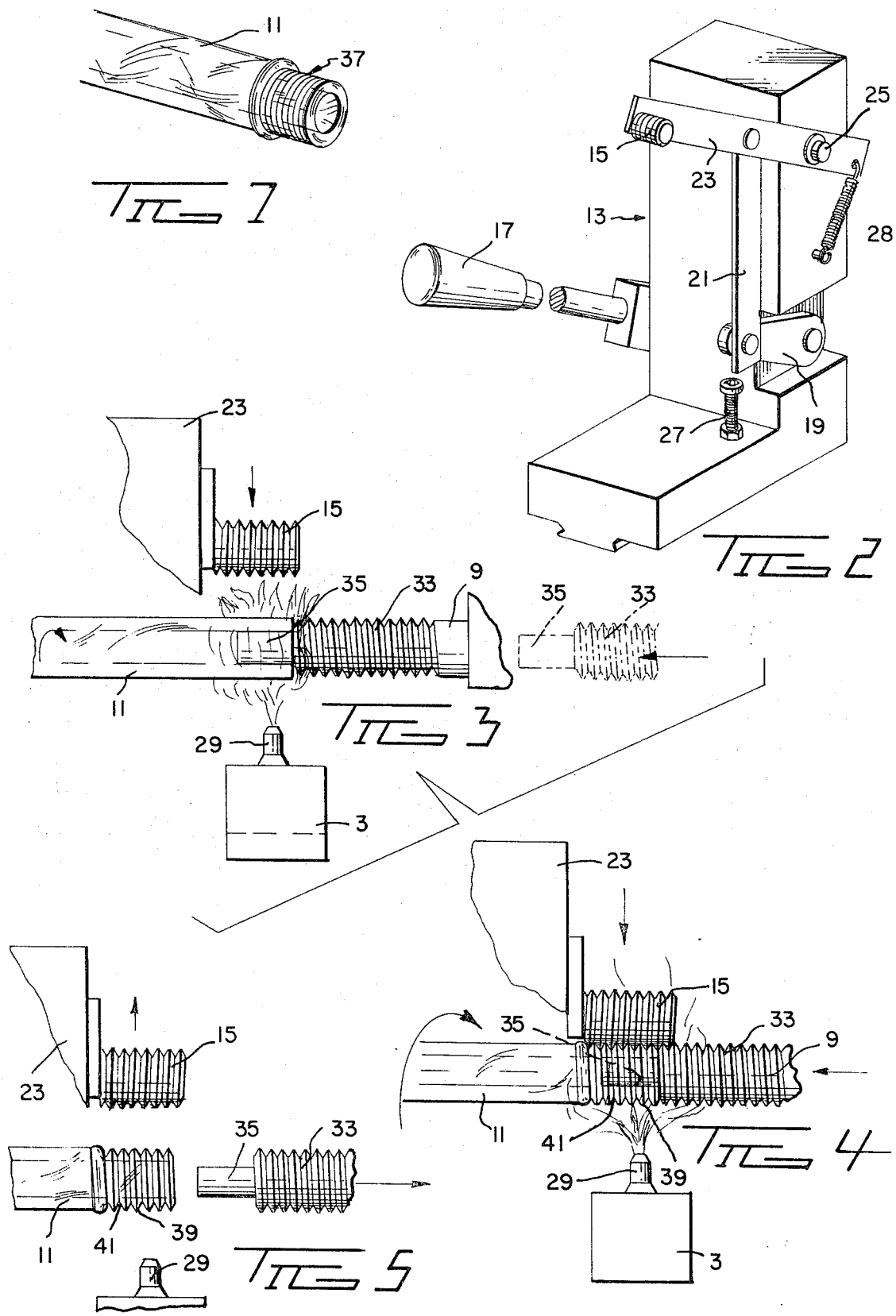

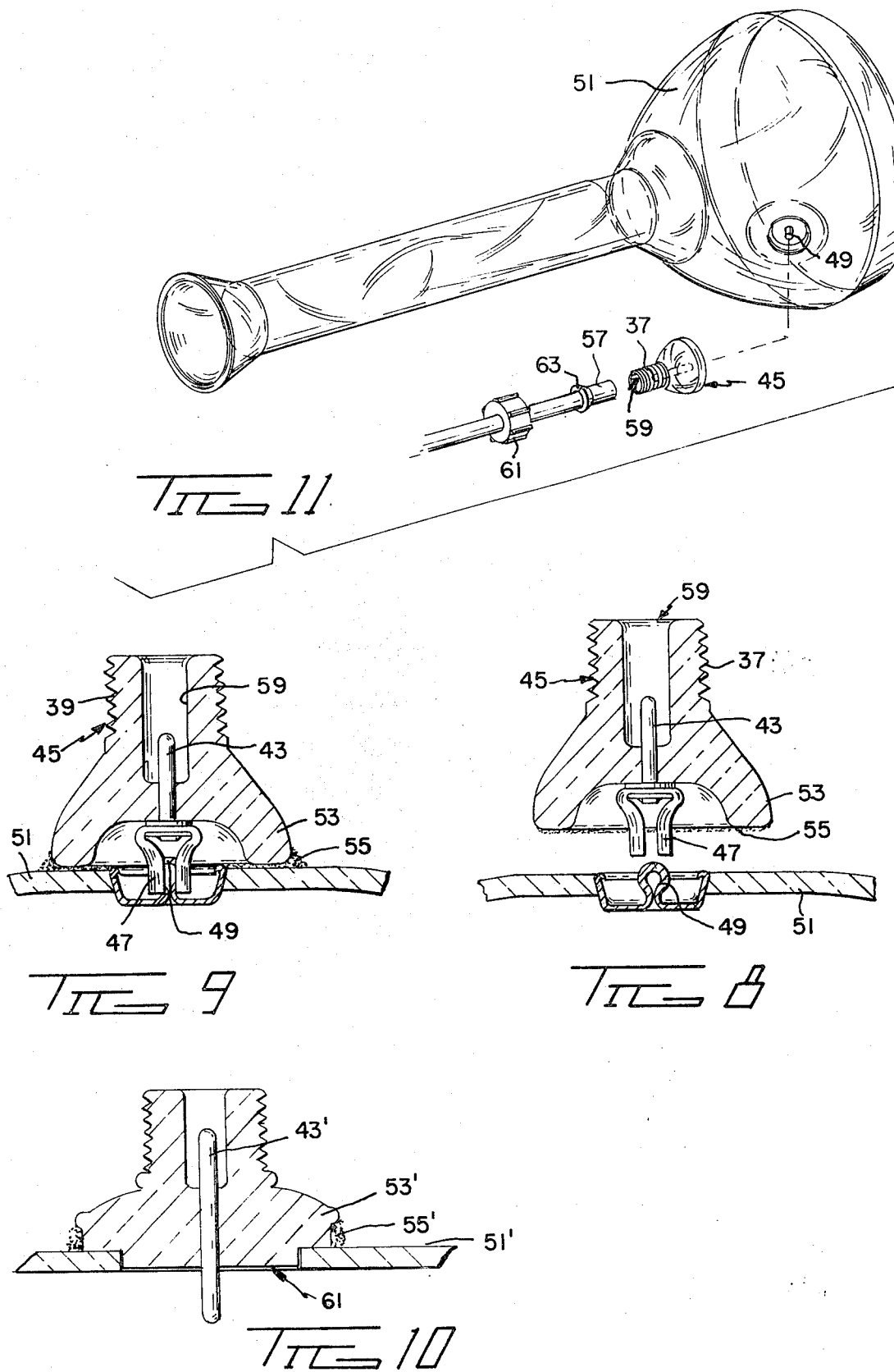

United States Patent Office 3,759,682
Patented Sept. 18, 1973

3,759,682
METHOD OF AND SYSTEM FOR THREADING GLASS CONNECTORS AND CONNECTOR
John Wayne Tiley, Hatboro, Pa., assignor to
AMP Incorporated, Harrisburg, Pa.
Filed Dec. 13, 1971, Ser. No. 207,146
Int. Cl. C03b 23/04
U.S. Cl. 65—109                    3 Claims

ABSTRACT OF THE DISCLOSURE

The disclosure relates to a method of and system for threading glass connectors wherein the glass to be threaded is placed in a glass lathe and rotated, a mandrel supporting the end of the glass member to be threaded. The mandrel includes a threaded portion thereon for mating with a threading member which forms the threads on the glass. The threading member forms grooves in the glass between threads having a small radius, the threads also having a small radius, thereby minimizing the tensile strength loss of the glass relative to prior art methods of threading glass.

---

This invention relates to a method of and system for threading glass connectors and connector and, more specifically, to a method of forming threads in a glass connector by rolling the threads thereon.

Threaded glass connectors have been known in the prior art. Connectors of this type have been threaded usually by grinding and the like, the threads being formed having pointed peaks and valleys. Threads of this type have displayed substantially diminished tensile strength which has resulted in breakage caused by bending or placing tensile stress thereon, especially in the valleys between threads.

In accordance with the present invention there is provided an improved method and system for forming threads in glass members, such as connectors, to minimize the problems of the prior art. Briefly, glass connectors are threaded by rolling the threads onto the heated glass, the threads formed having rounded peaks and valleys of small radius.

It is therefore an object of this invention to provide a threaded glass member wherein the peaks of the threads and the valleys between the threads are rounded and have small radius.

It is a further object of this invention to provide a method of and system for forming threaded glass members wherein the threads are rolled onto the glass.

It is a still further object of this invention to provide a threaded glass member having threads of high tensile strength relative to prior art threaded glass members.

The above objects and still further objects of the invention will immediately become apparent to those skilled in the art after consideration of the following preferred embodiment thereof, which is provided by way of example and not by way of limitation, wherein:

FIG. 2 is an enlarged view of the roller device of FIG. 1 for rolling threads onto glass;

FIG. 3 is a diagrammatic view showing a portion of the roller device, the glass to be threaded and the mandrel at commencement of a threading operation;

FIG. 4 is a view the same as FIG. 3 during thread rolling;

FIG. 5 is a view the same as FIG. 3 after completion of the threading operation;

FIG. 7 is an elevational view of a threaded glass member;

FIG. 8 is a sectional view of a completed connector in the process being connected to a device such as a cathode ray tube;

FIG. 9 is a view as in FIG. 8 with the glass connector cemented to the cathode ray tube;

FIG. 10 is a sectional view of a second embodiment of a glass connector in accordance with the present invention; and FIG. 11 is an exploded view of a high voltage glass connector as formed by the present invention as it would be used with a cathode ray tube.

Figure 1:
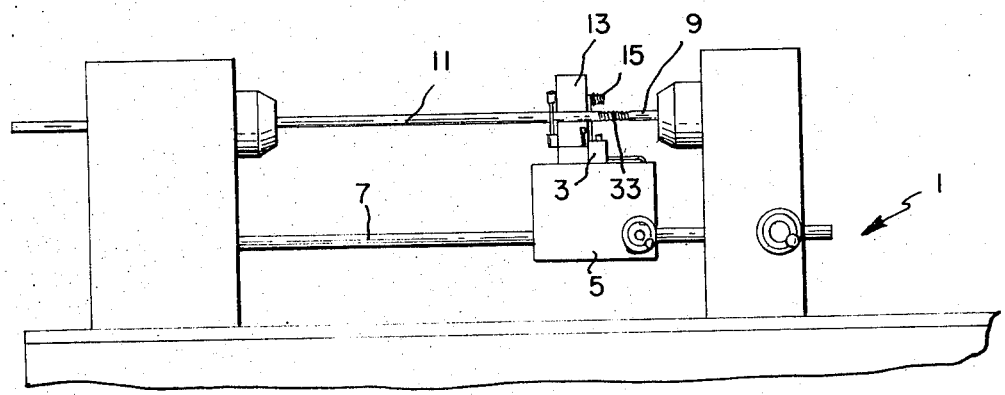
FIG. 1 is a system for rolling threads on glass members in accordance with the present invention.

Referring now to FIG. 1, there is shown a glass lathe 1 having a burner 3 positioned on a holder 5 movable along a shaft 7. The burner 3 can be positioned horizontally by movement of the holder 5 along shaft 7 or by vertical movement of the burner 3. The lathe 1 also includes a threaded mandrel 9 rotatable therein, a glass member 11 to be threaded and a threading device 13 having a roller 15. Both the glass member 11 and the mandrel 9 are rotatable.

The threading device 13 is shown in more detail in FIG. 2. The device 13 includes a handle 17 which when moved downward, rotates lever 19 which, via arm 21, pulls down arm 23, the latter rotating about pivot 25 and carrying the rotatable roller 15. Downward movement of roller 15 is limited by limiting screw 27 which is adjustable and positioned under the arm 21. Arm 23 is biased in the upward position by biasing spring 28.

Figure 6:
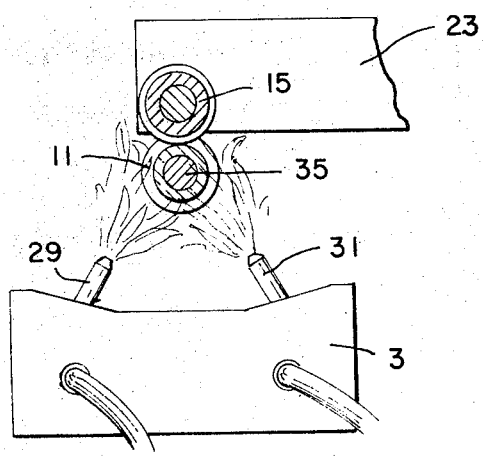
FIG. 6 is a side view of the glass heater when the threading operation is in the phase as shown in FIG. 4.

The burner 3 is shown in more detail in FIG. 6 and includes a pair of jets 29 and 31 which direct a flame toward a point at which the glass member 11 is positioned. The jets 29 and 31 and the glass member 11 form the apices of an essentially equilateral triangle.

In actual operation, the glass member 11 is positioned with one end thereof in the flame formed by jets 29 and 31 as shown in FIGS. 3 and 6. The glass is heated to about its melting point wherein it becomes pliable. The mandrel 9 (FIG. 3) is moved to the left whereupon the finger portion 35 of the mandrel 9 enters into the glass member 11. If the glass member 11 is hollow, the finger 35 enters therein. If the glass member 11 is solid, the finger 35 forms a hollow region therein due to the plastic state of the glass member. Both the glass member 11 and the mandrel 9 are rotating at this time.

The handle 17 is then lowered (FIG. 2) causing the arm 23 to move downwardly as shown in FIG. 4 until the grooves of the rotatable roller 15 mate with the grooves 33 on mandrel 9, the glass still being heated. Since the mandrel 9 and the glass member 11 are being rotated and the end of the glass member is soft due to the heat, the roller 15 rotates due to its engagement with the grooves 33 and moves toward the right as shown in the drawings due to the normal action of engaged rotating threads and forms the threads 37 in the glass member 11. Due to the plastic nature of the glass at this time, the peaks 39 and valleys 41 will be rounded and have a small radius. It will be apparent that the holder 5 will move laterally along with the movement of roller 15.

The heat is now removed, the roller 15 is allowed to move upwardly and the mandrel 9 is removed as shown in FIG. 5. The glass member 11 now has the threads formed thereon as shown in FIG. 7.

If desired, an electrical terminal 43 as shown in FIG. 8 can be placed in the glass member. In this figure, an electrical connector 45 for use with high voltage circuits of cathode ray tubes is shown. A contact member 47 is secured to terminal 43 and mates with a lead terminal 49 extending through a glass plate 51, such as the surface of a cathode ray tube. The contact member 47 is secured to lead terminal 49 as shown in FIG. 9, the annular flange portion 53 contacting the glass plate 51 and being cemented thereto by an appropriate cement 55. This connection is shown in exploded view in FIG. 11 wherein the glass plate 51 is shown as a cathode ray tube. There is further shown an electrical connector 57 for connection to the terminal 43, the connector 57 being held in proper position within the aperture 59 by means of the threaded member 61 which rests against the flange 63 on connector 57 and is threaded onto the threads 37 of connector 45.

Referring now to FIG. 10, there is shown a second embodiment of a connector formed by the above described process. Here the flanges 53 are replaced by a flat portion 61 which extends downwardly into an aperture in plate 51', the flange portion 53' resting on plate 51' and being cemented thereto with appropriate cement 55'.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A system for forming threads in a glass member which comprises:
   (a) rotatable means for supporting a glass member to be threaded on one end thereof on the non-threaded end thereof,
   (b) a rotatable mandrel for entering within the end of said glass member to be threaded, said mandrel including a threaded portion thereon,
   (c) means for heating said end of said glass member to be threaded to about its melting point, and
   (d) rotatable threaded cylinder means for engaging said end of said glass member to be threaded and the threaded portion of said mandrel.

2. A method of forming threads in a glass member which comprises the steps of:
   (a) providing a rotatable means for supporting a glass member to be threaded on one end thereof on the non-threaded end thereof,
   (b) providing a rotatable mandrel for entering within the end of said glass member to be threaded, the mandrel including a threaded portion thereonf,
   (c) providing means for heating said end of said glass member to be threaded to about its melting point,
   (d) providing a rotatable threaded cylinder means for contacting said end of said glass member to be threaded and the threaded portion of said mandrel,
   (e) heating said glass member to substantially its melting point with said means for heating while rotating said glass member in said rotatable means and maintaining said glass member axially positioned with said rotatable mandrel,
   (f) engaging said rotatable threaded cylinder with said rotating heated glass member and said threaded portion of said mandrel, to rotate said rotatable threaded cylinder and,
   (g) removing said heat and said rotatable threaded cylinder from said glass member.

3. A method as set forth in claim 2 wherein said heat and said threaded cylinder are removed from said glass member substantially simultaneously.

References Cited
UNITED STATES PATENTS

| | | | |
|---|---|---|---|
| 442,258 | 12/1890 | Phillips | 65—293 |
| 3,171,730 | 3/1965 | Zauner | 65—293 X |

OTHER REFERENCES

Ser. No. 418,602, Dichter (A.P.C.), published April, 1943.

ARTHUR D. KELLOGG, Primary Examiner

U.S. Cl. X.R.

65—293